US011395273B2

(12) United States Patent
Niu et al.

(10) Patent No.: US 11,395,273 B2
(45) Date of Patent: Jul. 19, 2022

(54) METHOD AND APPARATUS FOR UPLINK TRANSMISSION IN MULTI-CARRIER SYSTEMS

(71) Applicant: ZTE CORPORATION, Guangdong (CN)

(72) Inventors: Li Niu, Guangdong (CN); Yajun Zhao, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 16/871,577

(22) Filed: May 11, 2020

(65) Prior Publication Data

US 2020/0305148 A1    Sep. 24, 2020

Related U.S. Application Data

(63) Continuation of application No. PCT/CN2017/111725, filed on Nov. 17, 2017.

(51) Int. Cl.
*H04W 72/04* (2009.01)
*H04W 52/36* (2009.01)

(52) U.S. Cl.
CPC ..... *H04W 72/0413* (2013.01); *H04W 52/365* (2013.01); *H04W 72/042* (2013.01)

(58) Field of Classification Search
CPC .......... H04W 72/0413; H04W 52/365; H04W 72/042; H04W 72/0473; H04W 72/0406; H04W 24/10
See application file for complete search history.

(56) References Cited

U.S. PATENT DOCUMENTS

| 10,187,180 | B2* | 1/2019 | Sorrentino | H04L 1/0031 |
| 10,389,422 | B2* | 8/2019 | Muruganathan | H04B 7/0619 |
| 2010/0273515 | A1 | 10/2010 | Fabien et al. | |
| 2016/0242128 | A1* | 8/2016 | Loehr | H04W 52/367 |
| 2018/0132197 | A1* | 5/2018 | Lin | H04W 52/365 |
| 2018/0279339 | A1* | 9/2018 | Lohr | H04W 72/14 |

FOREIGN PATENT DOCUMENTS

| CN | 102300321 A | 12/2011 |
| CN | 105491624 A | 4/2016 |

\* cited by examiner

*Primary Examiner* — Brian T O Connor
(74) *Attorney, Agent, or Firm* — Duane Morris LLP

(57) ABSTRACT

A method and apparatus for plink carrier selection and uplink transmission in multi-carrier systems is disclosed. In one embodiment, a method performed by a wireless communication device, comprising: receiving a message containing first information of at least one first uplink transmission resource from a wireless communication node; based on the first information, determining at least one power headroom (PH) value for the at least one first uplink transmission resource; and reporting second information of the at least one first uplink transmission resource to the wireless communication node.

20 Claims, 10 Drawing Sheets

350

| C7 | C6 | C5 | C4 | C3 | C2 | C1 | R |
|----|----|----|----|----|----|----|---|
| P | V | \multicolumn{6}{c}{PH(type 2,PCell)} | | | | | |

352-1: | P | V | PH(type 2,PCell) |
352-2: | R | R | Pcmax,c |
352-3: | P | V | PH(type 2,PUCCH SCell) |
352-4: | R | R | Pcmax,c |
352-5: | P | V | PH(type 1,PCell) |
352-6: | R | R | Pcmax,c |

353-1:
352-7: | P | V | PH(type X,SCell i) |
352-8: | E | R | Pcmax,c |
352-9: | P | V | PH(type X,SCell i) |
352-10: | R | R | Pcmax,c |

353-2:
352-11: | P | V | PH(type X,Scell n) |
352-12: | R | R | Pcmax,c |

FIG.3F

METHOD AND APPARATUS FOR UPLINK TRANSMISSION IN MULTI-CARRIER SYSTEMS

TECHNICAL FIELD

This disclosure relates generally to wireless communications and, more particularly, to a method and apparatus for uplink carrier selection and uplink transmission in multi-carrier systems.

BACKGROUND

With the continuous development of wireless communication technologies, a wide range of wireless communication services are emerging, which will greatly increase the demand for bandwidth in wireless communication systems. Thus, the traditional frequency range of 300 MegaHertz (MHz) to 3 GigaHertz (GHz) for commercial communication systems must be utilized efficiently in order to meet the market demand for future wireless communication services.

In the future 5G wireless communication system, also known as New Radio (NR), the carrier frequency can be higher than that in traditional wireless communication systems. For example, it is contemplated that the NR communication system may operate at frequencies of 28 GHz, 45 GHz, and up to 100 GHz to deliver high data rates with higher bandwidths, thus higher cell throughput. In addition to the higher operating frequencies and wider channel bandwidths, a higher spectrum efficiency in 5G NR may be achieved through the use more sophisticated signal structures, as well as other technologies, e.g., higher-order modulation schemes, multiple-input-multiple-output (MIMO) technologies, etc., in the NR communication systems and protocols.

High frequency carriers with high bandwidth can be used where there is a sufficient high signal to noise ratio. In general, when a user equipment (hereinafter "UE") is close to the base station (hereinafter "BS"), a strong direct line of sight is available, when the UE is fixed or moves with small velocities, especially within a very small-cell BS area, e.g., home base station, and under excellent environmental conditions. In other words, because of the high path loss associated with high frequency carriers, in order to achieve the same coverage reliability as transmissions using low frequency carriers, the transmission using high frequency carriers requires a relatively larger transmission power, which is manageable in downlink (DL) transmission where the transmission power of the BS can be adjusted. However, for uplink (UL) transmission, using high frequency carriers to improve cell throughput and bandwidth is challenging, because of the power constraint on the UE. Considering the maximum transmit power of the terminal is 23 dBm, the greater the path loss, the smaller the bandwidth of carriers. In short, for communication systems with high frequency carriers, the uplink transmission of the UE is limited by its maximum transmission power, which also limits the bandwidth of resources transmitted by the UE, thereby affecting the uplink throughput. Therefore, communication systems operating at low frequencies can have higher throughput compared to those operating at high frequencies, because of a potentially lower path loss.

In order to solve the problem of limited uplink throughput using high frequency carriers, SUL (supplementary uplink) carriers can be introduced. More specifically, one uplink carrier and one downlink carrier in a high frequency band, as well as one uplink carrier in a low frequency band can be configured in a cell, which may provide a larger coverage. However, considering the complexity of production realization and forward compatibility, there is only one HARQ (hybrid automatic repeat request) entity for uplink transmission. Therefore, a UE with a multi-band capability, can only use one frequency band for the uplink transmission, and thus the UE does not support simultaneous transmission on two uplink carriers. Thus, there exists a need to develop protocol to select an uplink carrier for uplink transmission in multi-carrier systems.

SUMMARY OF THE INVENTION

The exemplary embodiments disclosed herein are directed to solving the issues related to one or more problems presented in the prior art, as well as providing additional features that will become readily apparent by reference to the following detailed description when taken in conjunction with the accompany drawings. In accordance with various embodiments, exemplary systems, methods, and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the invention.

In one embodiment, a method performed by a wireless communication device, comprising: receiving a message containing first information of at least one first uplink transmission resource from a wireless communication node; based on the first information, determining at least one power headroom (PH) value for the at least one first uplink transmission resource; and reporting second information of the at least one first uplink transmission resource to the wireless communication node.

In another embodiment, a method performed by a wireless communication node, comprising: transmitting first information of at least one first uplink transmission resource to a wireless communication device; receiving second information from the wireless communication device, wherein the second information comprises the at least one power headroom (PH) value corresponding to the at least one first uplink transmission resource; and selecting at least one second uplink carrier for the wireless communication device to perform an uplink communication.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of discussion.

FIG. 3F illustrates a power headroom report (PHR) format transmitted from a UE to a BS, in accordance with some embodiments of the present disclosure.

DETAILED DESCRIPTION OF EXEMPLARY EMBODIMENTS

Figure 1A:
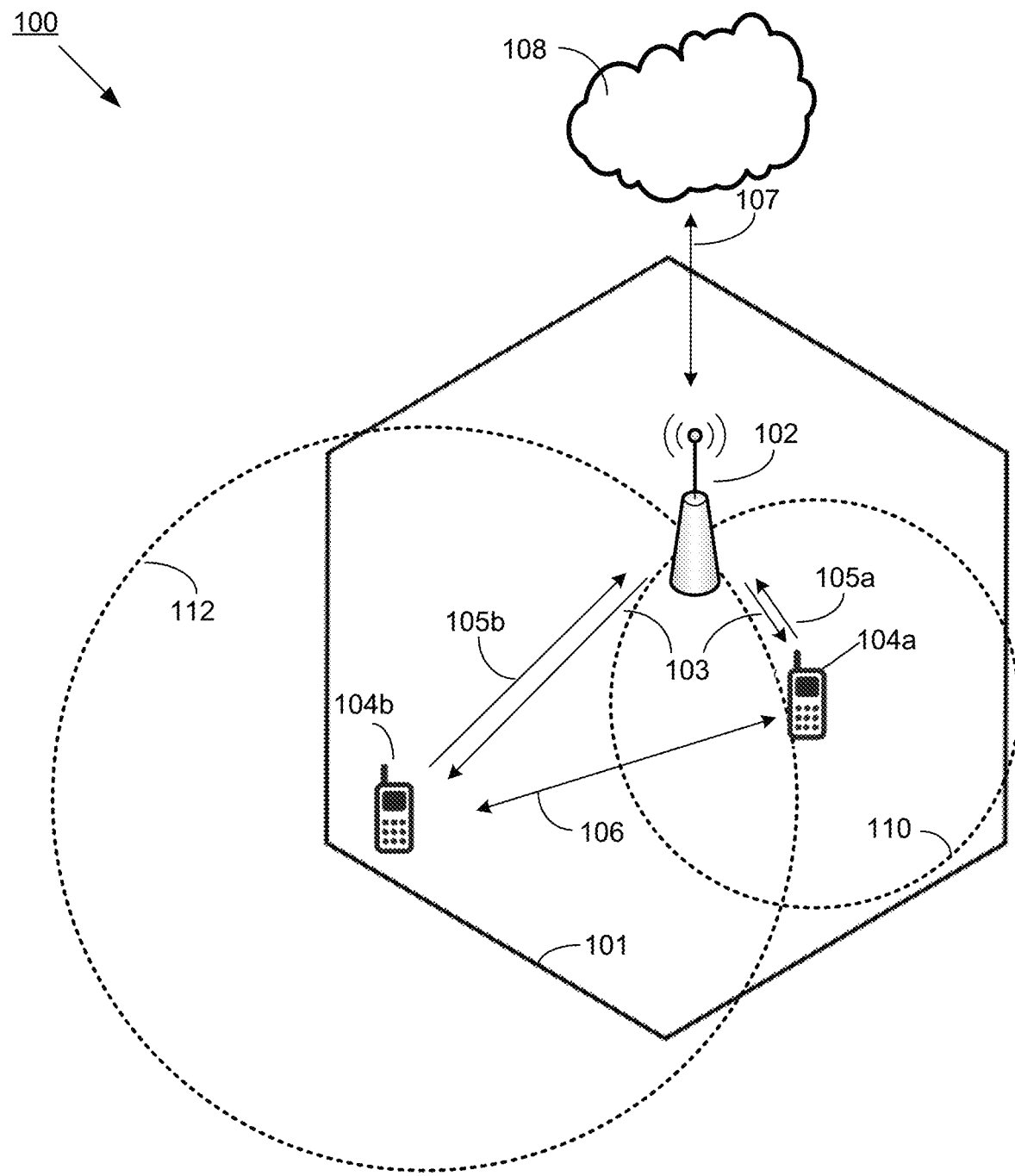
FIG. 1A illustrates an exemplary wireless communication network illustrating a number of uplink transmission resources as a function of distance from a BS to a UE, in accordance with some embodiments of the present disclosure.

Various exemplary embodiments of the invention are described below with reference to the accompanying figures to enable a person of ordinary skill in the art to make and use the invention. As would be apparent to those of ordinary skill in the art, after reading the present disclosure, various changes or modifications to the examples described herein can be made without departing from the scope of the invention. Thus, the present invention is not limited to the exemplary embodiments and applications described or illustrated herein. Additionally, the specific order or hierarchy of steps in the methods disclosed herein are merely exemplary approaches. Based upon design preferences, the specific order or hierarchy of steps of the disclosed methods or processes can be re-arranged while remaining within the scope of the present invention. Thus, those of ordinary skill in the art will understand that the methods and techniques disclosed herein present various steps or acts in a sample order, and the invention is not limited to the specific order or hierarchy presented unless expressly stated otherwise.

Embodiments of the present invention are described in detail with reference to the accompanying drawings. The same or similar components may be designated by the same or similar reference numerals although they are illustrated in different drawings. Detailed descriptions of constructions or processes well-known in the art may be omitted to avoid obscuring the subject matter of the present invention. Further, the terms are defined in consideration of their functionality in embodiment of the present invention, and may vary according to the intention of a user or an operator, usage, etc. Therefore, the definition should be made on the basis of the overall content of the present specification.

FIG. 1A illustrates an exemplary wireless communication network 100 illustrating a number of uplink transmission resource as a function distance from a BS 102 to a UE 104, in accordance with some embodiments of the present disclosure. As used herein, "transmission resource" means a carrier, a bandwidth part or a cell. In a wireless communication system, a network side communication node or a base station (BS) can be a node B, an E-utran Node B (also known as Evolved Node B, eNodeB or eNB), a pico station, a femto station, or the like. A terminal side node or a user equipment (UE) can be a long range communication system like a mobile phone, a smart phone, a personal digital assistant (PDA), tablet, laptop computer, or a short range communication system such as, for example a wearable device, a vehicle with a vehicular communication system and the like. A network and a terminal side communication node are represented by a BS 102 and a UE 104, respectively, which are generally referred to as "communication nodes" and "communication devices", respectively, herein. Such communication nodes may be capable of wireless and/or wired communications, in accordance with various embodiments of the invention. It is noted that all the embodiments are merely preferred examples, and are not intended to limit the present disclosure. Accordingly, it is understood that the system may include any desired combination of UEs and BSs, while remaining within the scope of the present disclosure.

Referring to FIG. 1A, the wireless communication network 100 includes a BS 102 and two UE's 104a and 104b, generally referred to as UEs 104 collectively, or UE 104 individually, herein. The BS 102 and the UEs 104 are contained within a geographic boundary of cell 101. A wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. The UE 104a has a direct communication channel with the BS 102 operating at a first frequency f1 for downlink communication 103 and a second frequency f2 for uplink communication 105a. Similarly, the UE 104b also has a direct communication channel with the BS 102 operating at the first frequency f1 for downlink communication 103 and a third frequency f3 for uplink communication. In some embodiments, the second frequency f2 and the third frequency f3 are different from the first frequency f1. In some embodiments, the second frequency f2 and the third frequency f3 are different from each other. Therefore, the second frequency f2 and the third frequency f3 have different transmission characteristics, such as for example path loss, coverage, maximum transmission power, etc. In some embodiments, the bandwidth of the first frequency f1, the second frequency f2 and the third frequency f3 can be also different. In some embodiments, the second frequency f2 and the third frequency f3 may have different transmission characteristics on different bandwidth, such as for example path loss, coverage, maximum transmission power, etc. Although only 2 UEs 104 are shown in FIG. 1A, it should be noted that any number of UEs 104 can be included in the cell 101 in accordance with various embodiments of the invention. In some embodiments, the coverage of uplink communication 105b is larger than that of the uplink communication 105a, as indicated by doted circles 112 and 110, respectively. The BS 102 is located at the intercept region of the coverage areas 110 and 112 in order for the BS 102 to perform uplink communication with the UE 104a and UE 104b in the cell 101.

When the UE 104b is at the extreme cell edge 101, e.g., with a longer distance between the BS 102 and UE 104b, path loss becomes significant, so the UE 104b will transmit at a maximum power over a long distance at the third frequency f3. As a result, the data rate is relatively low between BS 102 and UE 104b in this case. As the UE 104 (e.g., UE 104a) moves closer to the BS 102 (i.e., UE104a), the path loss decreases and the signal level at the BS 102 increases, thus the SNR improves. In response, the BS 102 instructs the UE 104 to reduce power on the second frequency f2 to minimize interference to other UE's and/or the BS 102.

Power headroom (PHR) value is defined as the difference between the terminal maximum transmit power and the estimated power for UL communication, including shared channel transmission, sounding reference signal (SRS) transmission, and/or physical control channel (PUCCH) transmission. As discussed above, instead of having only one PH value for the cell 101, there can be one PH value for each uplink transmission resource, wherein the transmission resource can be one of the following: a carrier, a bandwidth parts, and a cell, due to their unique transmission characteristics, in accordance with various embodiments. As used herein, "bandwidth part" consists a group of contiguous physical resource blocks (PRB's).

The direct communication channels 105/103 between the UEs 104 and the BS 102 can be through interfaces such as an Uu interface, which is also known as UMTS (Universal Mobile Telecommunication System (UMTS) air interface. The direct communication channels (sidelink transmission) 106 between the UEs can be through a PC5 interface, which is introduced to address high moving speed and high density applications such as Vehicle-to-Vehicle (V2V) communications. The BS 102 is connected to a core network (CN) 108 through an external interface 107, e.g., an Iu interface.

Figure 1B:
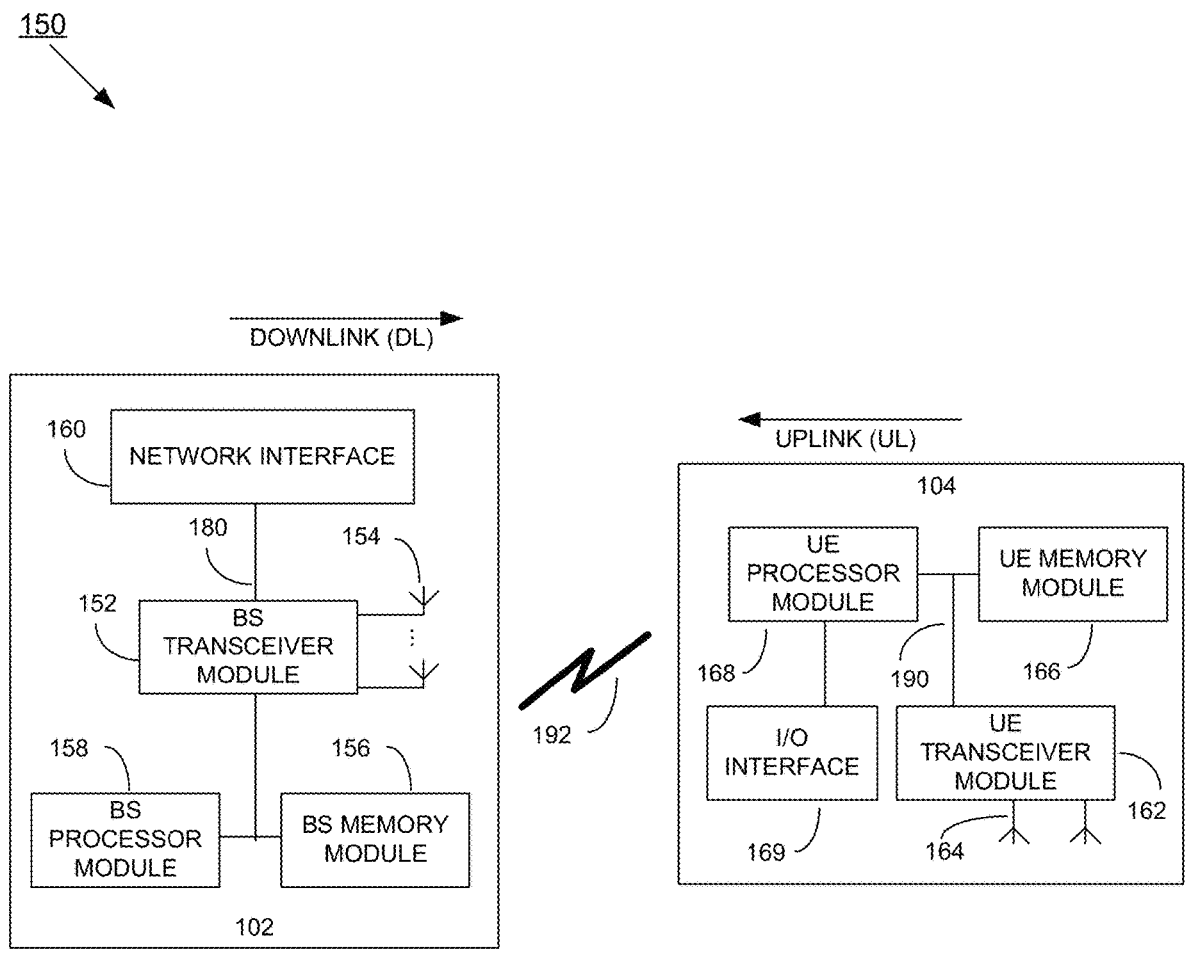
FIG. 1B illustrates a block diagram of an exemplary wireless communication system for uplink transmission in a multi-carrier system, in accordance with some embodiments of the present disclosure.

FIG. 1B illustrates a block diagram of an exemplary wireless communication system 150 for uplink transmission in a multi-carrier system, in accordance with some embodiments of the present disclosure. The system 150 may include components and elements configured to support known or conventional operating features that need not be described in detail herein. In one exemplary embodiment, system 150 can be used to transmit and receive data symbols in a wireless communication environment such as the wireless communication network 100 of FIG. 1A, as described above.

System 150 generally includes a BS 102 and at least one UE 104. As discussed above, any number of BS's and UE's may be utilized, in accordance with various embodiments. The BS 102 includes a BS transceiver module 152, a BS antenna array 154, a BS memory module 156, a BS processor module 158, and a network interface 160, each module being coupled and interconnected with one another as necessary via a data communication bus 180. The UE 104 includes a UE transceiver module 162, a UE antenna 164, a UE memory module 166, a UE processor module 168, and a I/O interface 169, each module being coupled and interconnected with one another as necessary via a date communication bus 190. The BS 102 communicates with the UE 104 via a communication channel 192, which can be any wireless channel or other medium known in the art suitable for transmission of data as described herein.

As would be understood by persons of ordinary skill in the art, system 150 may further include any number of components, blocks, modules, etc. other than those shown in FIG. 1B. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as limiting the scope of the present invention.

As discussed above, a wireless transmission from a transmitting antenna of the UE 104 to a receiving antenna of the BS 102 is known as an uplink transmission, and a wireless transmission from a transmitting antenna of the BS 102 to a receiving antenna of the UE 104 is known as a downlink transmission. In accordance with some embodiments, a UE transceiver 162 may be referred to herein as an "uplink" transceiver 162 that includes a RF transmitter and receiver circuitry that are each coupled to the UE antenna 164. A duplex switch (not shown) may alternatively couple the uplink transmitter or receiver to the uplink antenna in time duplex fashion. Similarly, in accordance with some embodiments, the BS transceiver 152 may be referred to herein as a "downlink" transceiver 152 that includes RF transmitter and receiver circuitry that are each coupled to the antenna array 154. A downlink duplex switch may alternatively couple the downlink transmitter or receiver to the downlink antenna array 154 in time duplex fashion. The operations of the two transceivers 152 and 162 are coordinated in time such that the uplink receiver is coupled to the uplink UE antenna 164 for reception of transmissions over the wireless communication channel 192 at the same time that the downlink transmitter is coupled to the downlink antenna array 154. Preferably, there is close synchronization timing with only a minimal guard time between changes in duplex direction. The UE transceiver 162 communicates through the UE antenna 164 with the BS 102 via the wireless communication channel 192.

The UE transceiver 162 and the BS transceiver 152 are configured to communicate via the wireless data communication channel 192, and cooperate with a suitably configured RF antenna arrangement 154/164 that can support a particular wireless communication protocol and modulation scheme. In some embodiments, the BS transceiver 152 is configured to receive the PHR transmitted by the UE transceiver 162. In some embodiments, the UE transceiver 162 is configured to receive a RRC message from the BS transceiver 152. In some exemplary embodiments, the UE transceiver 162 and the BS transceiver 152 are configured to support industry standards such as the Long Term Evolution (LTE) and emerging 5G standards, and the like. It is understood, however, that the invention is not necessarily limited in application to a particular standard and associated protocols. Rather, the UE transceiver 162 and the BS transceiver 152 may be configured to support alternate, or additional, wireless data communication protocols, including future standards or variations thereof.

The BS processor modules 158 and UE processor modules 168 are implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Then the UE processor module 168 detects a RRC (radio resource control) message on the UE transceiver module 162, the UE processor module 168 is further configured to calculate corresponding PH values of the at least one UL transmission resource in the RRC message based on at least one predefined algorithm, wherein the at least one predefined algorithm is selected based on other parameters calculated or messages received. Whether a PHR process is required can be determined by monitoring the common configuration on a broadcasted RRC message received from the BS transceiver module 152 on the UE transceiver module 162. The UE processor module 168 is further configured to generate the PHR with the PHs calculated and sends the PHR to the UE transceiver module 162.

Furthermore, the steps of a method or algorithm described in connection with the embodiments disclosed herein may be embodied directly in hardware, in firmware, in a software module executed by processor modules 158 and 168, respectively, or in any practical combination thereof. The memory modules 156 and 166 may be realized as RAM memory, flash memory, ROM memory, EPROM memory, EEPROM memory, registers, a hard disk, a removable disk, a CD-ROM, or any other form of storage medium known in the art. In this regard, the memory modules 156 and 166 may be coupled to the processor modules 158 and 168, respectively, such that the processors modules 158 and 168 can read information from, and write information to, memory modules 156 and 166, respectively. The memory modules 156 and 166 may also be integrated into their respective processor modules 158 and 168. In some embodiments, the memory modules 156 and 166 may each include a cache memory for storing temporary variables or other intermediate information during execution of instructions to be executed by processor modules 158 and 168, respectively. Memory modules 156 and 166 may also each include non-volatile memory for storing instructions to be executed by the processor modules 158 and 168, respectively.

The network interface 160 generally represents the hardware, software, firmware, processing logic, and/or other components of the base station 102 that enable bi-directional communication between BS transceiver 152 and other network components and communication nodes configured to communication with the BS 102. For example, network interface 160 may be configured to support internet or WiMAX traffic. In a typical deployment, without limitation, network interface 160 provides an 802.3 Ethernet interface such that BS transceiver 152 can communicate with a conventional Ethernet based computer network. In this manner, the network interface 160 may include a physical interface for connection to the computer network (e.g., Mobile Switching Center (MSC)). The terms "configured for" or "configured to" as used herein with respect to a specified operation or function refers to a device, component, circuit, structure, machine, signal, etc. that is physically constructed, programmed, formatted and/or arranged to perform the specified operation or function. The network interface 160 could allow the BS 102 to communicate with other BSs or core network over a wired or wireless connection.

Referring again to FIG. 1A, as mentioned above, the BS 102 repeatedly broadcasts system information associated with the BS 102 to one or more UEs (e.g., 104) so as to allow the UE 104 to access the network within the cell 101 where the BS 102 is located, and in general, to operate properly within the cell 101. Plural information such as, for example, downlink and uplink cell bandwidths, downlink and uplink configuration, configuration for random access, etc., can be included in the system information, which will be discussed in further detail below. Typically, the BS 102 broadcasts a first signal carrying some major system information, for example, configuration of the cell 101 through a PBCH (Physical Broadcast Channel) or PDSCH. It is noted that the BS 102 may subsequently broadcast one or more signals carrying some other system information through respective channels (e.g., a Physical Downlink Shared Channel (PDSCH)).

Referring again to FIG. 1B, in some embodiments, the major system information carried by the first broadcast signal may be transmitted by the BS 102 in a symbol format via the communication channel 192. In accordance with some embodiments, an original form of the major system information may be presented as one or more sequences of digital bits and the one or more sequences of digital bits may be processed through plural steps (e.g., coding, scrambling, modulation, mapping steps, etc.), all of which can be processed by the BS processor module 158, to become the first broadcast signal. Similarly, when the UE 104 receives the first broadcast signal (in the symbol format) using the UE transceiver 162, in accordance with some embodiments, the UE processor module 168 may perform plural steps (demapping, demodulation, decoding steps, etc.) to estimate the major system information such as, for example, bit locations, bit numbers, etc., of the bits of the major system information. The UE processor module 168 is also coupled to the I/O interface 169, which provides the UE 104 with the ability to connect to other devices such as computers. The I/O interface 169 is the communication path between these accessories and the UE processor module 168.

In some embodiments, the UE 104 can operate in a hybrid communication network in which the UE communicates with the BS 102, and with other UEs, e.g., between 104*a* and 104*b*. As described in further detail below, the UE 104 supports sidelink communications with other UE's as well as downlink/uplink communications between the BS 102 and the UE 104. As discussed above, sidelink communication allows the UEs 104*a* and 104*b* to establish a direct communication link with each other, or with other UEs from different cells, without requiring the BS 102 to relay data between UE's.

Figure 2:
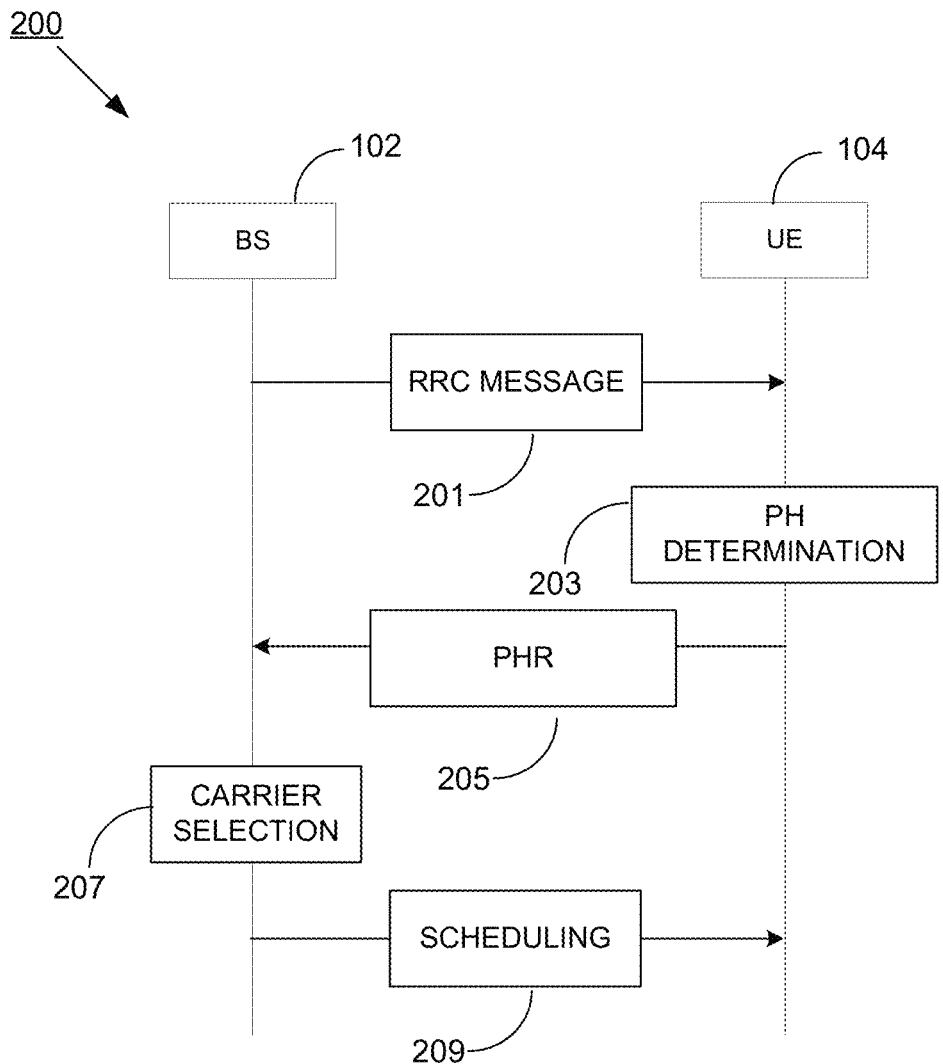
FIG. 2 illustrates a method of a Power Headroom (PH) reporting, in accordance with some embodiments of the present disclosure.

FIG. 2 illustrates a method 200 of a Power Headroom (PH) reporting, in accordance with various embodiments of the present disclosure. It is understood that additional operations may be provided before, during, and after the method 200 of FIG. 2, and that some other operations may be omitted or only briefly described herein. The PH reporting procedure is used to provide the BS 102 with information about the difference between the maximum transmit power and the estimated power for UL shared Channel (UL-SCH) transmission or sound reference signal (SRS) transmission for an UL transmission resource, wherein the transmission resource is a carrier, a bandwidth part, or a cell, and also with information about the difference between the maximum power and the estimated power for UL-SCH and physical uplink control channel (PUCCH) transmission for an UL transmission resource.

The method 200 starts with operation 201 in which a BS 102 transmits a Radio Resource Control (RRC) message to a UE 104. The message comprises information that are used for the determination of at least one UL transmission resource that requires a PH value reported from the UE 104. In some embodiments, the BS 102 notifies information of at least one UL carriers that are configured with a PUCCH channel or dedicated PUCCH resources for ACK/NACK, or a PUCCH location that required a PH value via system information or RRC dedicated message. In some embodiments, the information can further contain an indication of whether a PH reporting for the at least one UL carrier, that are configured with a PUCCH channel or dedicated PUCCH resources for ACK/NACK, or a PUCCH location, is required. In some embodiments, not all of the at least one UL carrier that are configured with a PUCCH channel or dedicated PUCCH resources for ACK/NACK, or a PUCCH location is required for a PH reporting. In some embodiments, the indication of whether a PH reporting for the at least one UL carrier is required can be a bitmap. In some embodiments, the RRC message can be RRCConnectionSetup or RRCConnectionReconfiguration message. This RRC message can be broadcasted on channels such as PDSCH channels and the like.

In some embodiments, the information of at least one UL transmission resource that is configured with one of the following resources can be also configured via a RRC message by the BS 102 to the UE 104 to request a PH reporting, for example such as scheduling request (SR) resources, channel quality indicator (CQI) resources, sounding reference symbols (SRS) dedicated resources, semi-persistent scheduling (SPS) resources.

In some embodiments, the BS 102 configures or reconfigures or adds or activates at least one of the following resources for the UE 104, including a PUCCH channel or dedicated PUCCH resources for ACK/NACK, SR resources, CQI resources, SRS dedicated resources, SPS resources, etc. on at least one UL transmission resource for the UE 104. In some embodiments, the above-mentioned resources are activated. According to certain embodiments, the BS 102 can also configure or reconfigure or add PUSCH and/or UL power dedicated configuration on the at least one UL transmission resource. In some embodiments, the BS 102 transmits information about the configuration and reconfiguration of the above-mentioned resources or configurations using an RRC message such as RRCConnectionSetup or RRCConnectionReconfiguration message.

Besides above-mentioned approach to indicate at least one UL transmission resource that requires a PH reporting, the BS 102 may further directly indicate at least one UL transmission resource that requires a PH reporting. For example, the BS 102 can indicate the at least one UL carrier that requires a PH reporting to the UE 104 explicitly using system information. In some embodiments, carrier indices and its mapping relationship with the UL transmission resources are transmitted from the BS 102 to the UE 104. For another example, the BS 102 can also indicate the at least one UL transmission resource that requires a PH reporting using a RRC message, including a RRCConectionSetup or RRCConnectionReconfiguration message, which comprises a bitmap or a list. Furthermore, the BS 102 can indicate the least one UL carrier or bandwidth using information in a control element of the MAC layer (MAC-CE), wherein the information can be at least one of the following: a frequency, a carrier index, a carrier indicator field (CIF), and a bitmap. For another example, the BS 102 can also indicate the at least one UL transmission resource that requires a PH reporting using information in downlink control information (DCI), wherein such information comprises at least one of the following: carrier index, carrier indicator field (CIF) and bitmap.

In some embodiments, the at least one UL transmission resource that requires a PH reporting can be a UL transmission resource that is activated, added, or switched to. In some embodiments, it is possible to add or remove at least one UL transmission resource to or from the original at least one UL transmission resource that requires a PH reporting as discussed above, using an RRC message, e.g, a RRCConnectionReconfiguration message. In some embodiments, it is possible for the BS 102 to activate at least one UL transmission resource for the UE 104 by MAC signaling.

The method 200 continues with operation 203 in which the UE 104 determines a corresponding PH value for each of the at least one UL transmission resource indicated by the BS 102, in accordance with various embodiments. For this purpose, the UE 104 estimates a transmission power for each of the at least one UL transmission resource using a predetermined function and further compares it to the available UL transmission power on the at least one UL transmission resource. For example, the UE 104 calculates the required UL transmission power value and thus the PH value based on parameters such as the scheduling information including an amount of allocated resources and a Modulation and Coding Scheme (MCS) allocated to the UE 104, and information used for estimating the channel condition such as a path loss. The available UL transmission power of the UE 104 is limited to the maximum transmission power of the UE 104 such that when the calculated transmission power exceeds the maximum transmission power the UE 104 performs the UL transmission at the maximum transmission power on the selected UL transmission resource. In this case, the UL transmission power is not enough, resulting in UL transmission quality degradation. Accordingly, it is preferred that the BS 102 performs a scheduling such that the required UL transmission power does not exceed the maximum UL transmission power of the UE 104. However, since BS 102 does not know the exact UL transmission power UE 104 used, the UE 104 has to report its PH value for each the at least one UL transmission resource to the BS 102 by means of a PH Report (PHR) so as to BS 102 determine the optimum UL transmission resource for an optimized UL communication.

The method 200 continues with operation 205 in which the UE 104 prepares a PH report (PHR) and transmits back to the BS 102, in accordance with various embodiments. A PHR can be transmitted on physical uplink shared channel (PUSCH) via MAC-CE, according to some embodiments. In some embodiments, a PHR is provided on MAC layer control information. In order to transmit the PHR efficiently, it can be advantageous to report the PH values and indication of all the UL transmission resources together on one single uplink transmission resource and/or in one single PHR.

In some embodiments, a method to indicate an uplink transmission resource is using a carrier index. In some embodiment, all of the uplink transmission resources of the UE 104 within either a single-cell or a multi-cell system have a unique index number. The BS 102 can indicate the carrier index of each uplink transmission resource to the UE 104 when the uplink transmission resource is added or configured. Alternatively, in certain embodiments, all the uplink transmission resources, especially in a multi-cell system, can be index using a carrier index and a cell index. For example, "CCCSSS" is the index of an uplink transmission resource. "CCC" represents the cell index, and "SSS" represents the carrier index of the uplink transmission resource in a cell. This method is advantageous because it reduces the signaling overhead as compared to the method of transmitting the PHs individually.

A PHR message comprises a plurality of octets, wherein each octets comprises 8 bits. In some embodiments, each octet in a PHR comprises a carrier index and a PH value of a corresponding UL transmission resource. In some embodiments, PH values of UL transmission resources in each cell are reported in a predefine order (e.g., UL transmission resource 1, UL transmission resource 2, UL transmission resource 3, etc.) without an introduction of carrier indices in a PHR. Discussions in detail are provided below in FIG. 3.

Figure 3A:
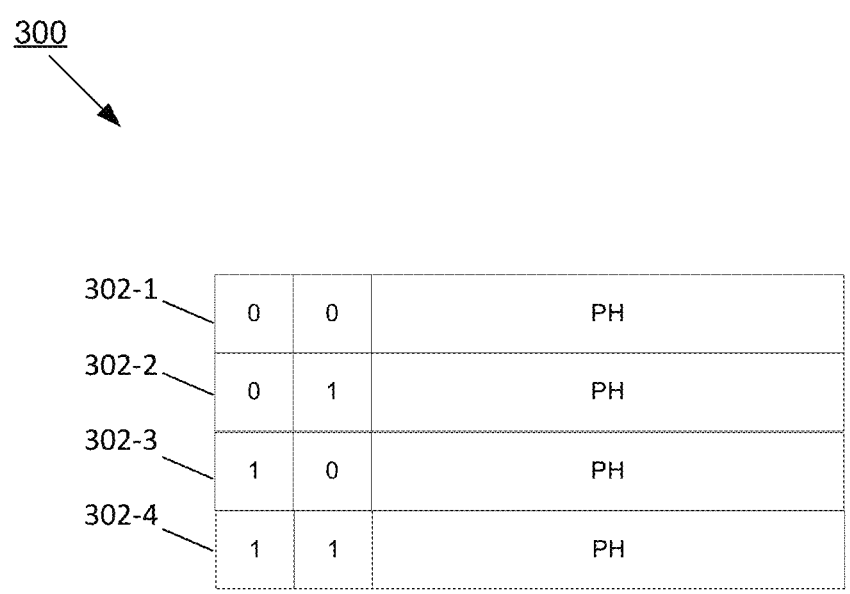
FIG. 3A illustrates a power headroom report (PHR) format transmitted from a UE to a BS, in accordance with some embodiments of the present disclosure.

FIG. 3A illustrates a power headroom report (PHR) format 300 transmitted from a UE 104 to a BS 102, in accordance with some embodiments of the present disclosure. Assuming there are 4 UL transmission resources can be supported by the UE 104 and thus, based on the discussions above, the maximum number of UL transmission resource that requires a PHR report is 4. In some embodiments, a PHR is MAC layer control information and comprises 4 octets (e.g., 302-1, 302-2, 302-3 and 302-4). Specifically, an octet in the PHR corresponds to one UL transmission resource, wherein first 2 bits of the octet are for carrier index indication rather than as reserved bits (R) and following 6 bits are for PH value indication. For example, the first 2 bits in octet 302-1 contain "00" to indicate a first UL transmission resource; the first 2 bits in octet 302-2 contain "01" to indicate a second UL transmission resource; the first 2 bits in octet 302-3 contain "10" to indicate a third UL transmission resource; and the first 2 bits in octet 302-4 contain "11" to indicate a fourth UL transmission resource. Although the maximum number of UL transmission resources of 4 is illustrated, more UL transmission resources can be included and PHR that associated with these additional UL transmission resources can be reported by reusing format 300, in accordance with some embodiments.

Figure 3B:
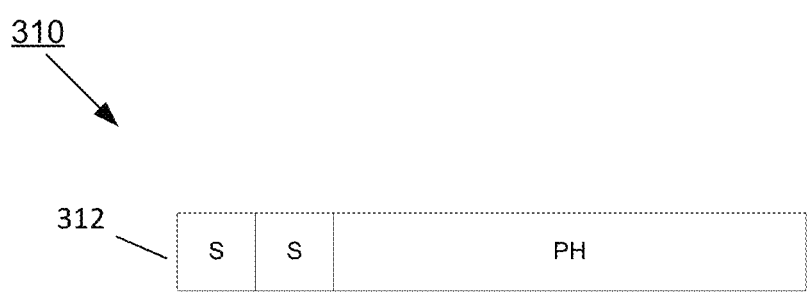
FIG. 3B illustrates a power headroom report (PHR) format transmitted from a UE to a BS, in accordance with some embodiments of the present disclosure.

FIG. 3B illustrates a power headroom report format 310 transmitted from the UE 104 to the BS 102, in accordance with some embodiments of the present disclosure. Assuming the maximum number of UL transmission resources that require PHR report is 4 and thus, based on the discussions above, but only 1 PH value for one uplink carrier is required to be reported. In some embodiments, a PHR is MAC layer control information and comprises 1 octet containing 8 bits. Specifically, first 2 bits are for carrier index indication rather than as S bits and following 6 bits are for PH value indication.

Figure 3C:
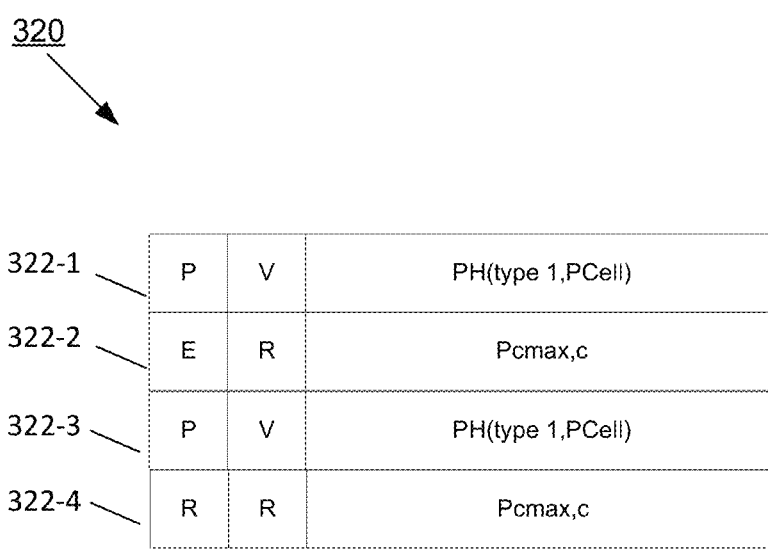
FIG. 3C illustrates a power headroom report (PHR) format transmitted from a UE to a BS, in accordance with some embodiments of the present disclosure.

FIG. 3C illustrates a power headroom (PHR) format 320 transmitted from the UE 104 to the BS 102, in accordance with various embodiments of the present disclosure. In some embodiments, a PHR is MAC layer control information and comprises 4 octets, e.g., octets 322-1, 322-2, 322-3 and 322-4. The octets 322-1 and 322-3 each comprises 1 P bit and 1 V bit and 6 bits for Indicating PH values. The P bit indicates whether the UE 104 applies a power backoff due to power management. In some embodiments, the P bit value can "1" or "0" depending on the maximum UE output power. The V bit indicates if the PH value is based on a real transmission or a reference format. For a type 1 PHR field, the V bit value can be "1" or "0" depending on whether or not the PH value is based on a real transmission or a reference format. In some embodiments, the 6 PH bits of the octets 322-1 and 322-3 contain a type 1 PHR field if a cell comprising 1 DL transmission resource and 2 UL transmission resources is configured as a PCell. The type 1 PHR is for a UL transmission resource in a PCell that has a PUSCH transmissions. In some embodiments, the octet 322-2 includes an E bit, an R bit, and 6 PH bits for indicating a maximum transmission power of the first UL transmission resource in the cell. The E bit is used rather than a R bit in the octet 322-2 to indicate whether one more type 1 PHR is followed for the same serving cell. Therefore, an E bit can be used by the BS 102 to determine the PHR report length of a cell with all its uplink transmission resources. Finally, the octet 322-4 includes 2 R bits and 6 bits for indicating a maximum transmit power level of the second UL transmission resource in the same cell. In some embodiments, the octets 322-1 and 322-2 are for a first UL transmission resource combined with the DL transmission resource in the PCell. In some embodiments, the octets 322-1 and 322-2 are for a first UL transmission resource where a dedicated PUCCH is configured. In some embodiments, the octets 322-3 and 322-4 are for a second UL transmission resource of the PCell.

Figure 3D:
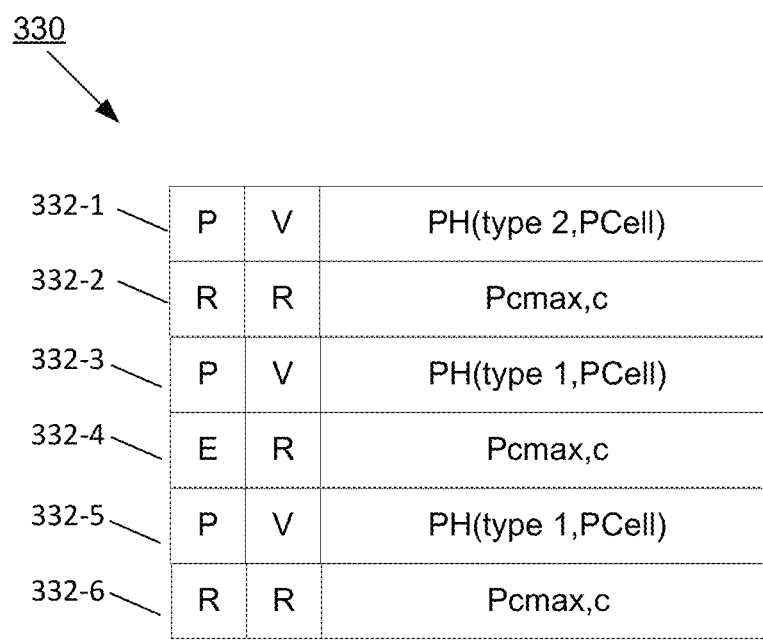
FIG. 3D illustrates a power headroom report (PHR) format transmitted from a UE to a BS, in accordance with some embodiments of the present disclosure.

FIG. 3D illustrates a power headroom (PHR) format 330 transmitted from the UE 104 to the BS 102, in accordance with some embodiments of the present disclosure. In some embodiments, a PHR is MAC layer control information and comprises 6 octets, e.g., octets 332-1, 332-2, 332-3, 332-4, 332-5, and 332-6. The octet 332-1 comprises 1 P bit, 1 V bit, and 6 bits for Indicating PH values. The P bit indicates whether the UE 104 applies a power backoff due to power management. In some embodiments, the P bit value can "1" or "0" depending on the maximum UE output power. The V bit indicates if the PH value is based on a real transmission or a reference format. For a type 1 PHR field, the V bit value can be "1" or "0" depending on whether or not the PH value is based on a real transmission or a reference format. In some embodiments, the 6 PH bits of the octet 332-1 contain a type 2 PHR field when a cell comprising 1 DL transmission resource and 2 UL resource is configured as a PCell and a type 2 PH is reported. The type 2 PHR is for a first UL transmission resource in the PCell that supports a simultaneous PUSCH and PUCCH transmissions. In some embodiments, the octet 332-2 includes 2 R bit, and 6 bits for indicating a maximum transmission power level of the first UL transmission resource (Pcmax, c). In some embodiments, the octet 332-1 and 332-2 are for the first UL carrier comprises PUCCH channel when type 2 PHR field is reported.

The octets 332-3 and 332-5 each comprises 1 P bit, 1 V bit, and 6 PH bits for indicating PH values. In some embodiments, the 6 PH bits of the octets 332-3 and 332-5 containing a type 1 PHR field. The type 1 PHR is for both of the UL carriers or bandwidth parts in the PCell that has a PUSCH transmission. The fourth octet 332-4 includes 1 E bit, 1 R bit, and 6 bits for indicating a maximum transmit power level of the first UL transmission resource in the PCell. The E bit is used rather than an R bit in the octet 332-4 to indicate whether one more type 1 PHR is followed for the same serving cell. Finally, the octet 332-6 includes 2 R bits and 6 bits for indicating a maximum transmit power level of a second UL transmission resource (Pcmax, c). The octets 322-3 and 322-4 are for the first UL transmission resource combined with the DL transmission resource of the PCell. In some embodiments, the octets 322-3 and 322-4 are for the first UL transmission resource of the PCell where the PUCCH is configured. The octets 322-5 and 322-6 are for the second UL transmission resource of the PCell.

Figure 3E:
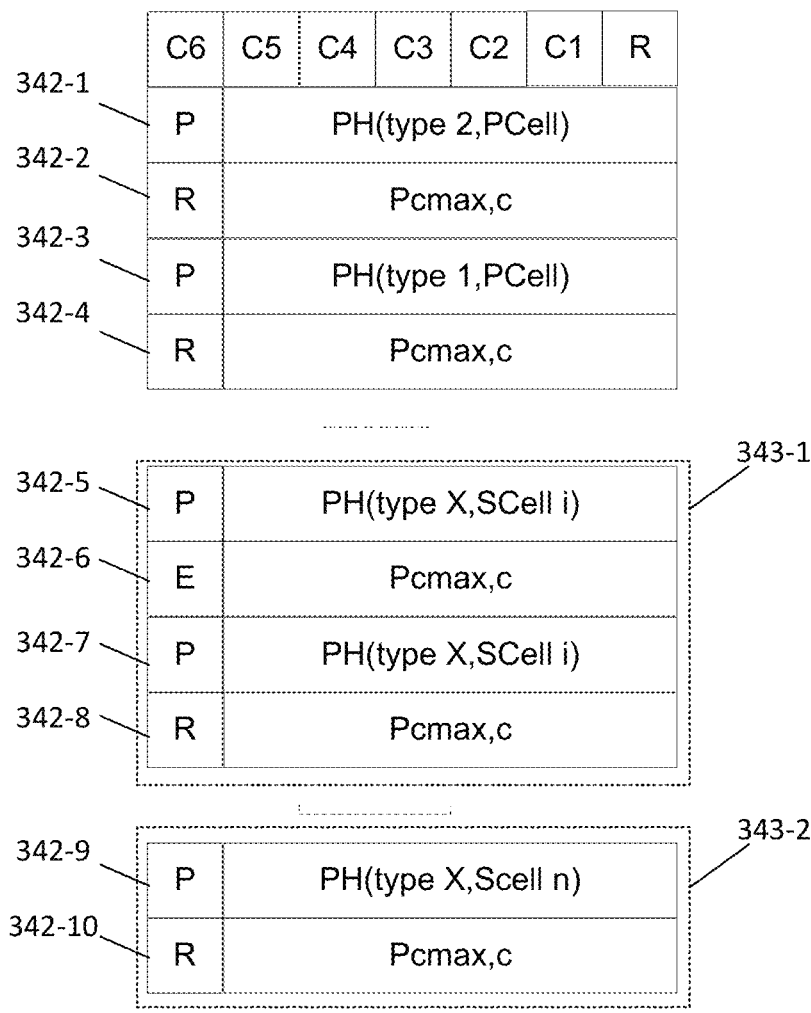
FIG. 3E illustrates a power headroom report (PHR) format transmitted from a UE to a BS, in accordance with some embodiments of the present disclosure.

FIG. 3E illustrates a power headroom (PHR) format 340 transmitted from the UE 104 to the BS 102, in accordance with some embodiments of the present disclosure. In some embodiments, a PHR is MAC layer control information and comprises 10 octets, e.g, octets 342-1, 342-2, 342-3, 342-4, 342-5, 342-6, 342-7, 342-8, 342-9, and 342-10. The octet 342-1 comprises 1 P bit, 1 V bit and 6 PH bits for Indicating PH values. The P bit indicates whether the UE 104 applies a power backoff due to power management. In some embodiments, the P bit value can be "1" or "0" depending on the maximum UE output power. The V bit indicates if the PH value is based on a real transmission or a reference format. In some embodiments, the V bit value can be "1" or "0" depending on whether or not the PH value is based on a real transmission or a reference format. In some embodiments, the 6 PH bits of the octet 342-1 contain a type 2 PHR field when a cell comprising a DL transmission resource and a plurality of UL transmission resource is configured as a PCell and a type 2 PH is reported. The type 2 PHR is for a UL transmission resource in a PCell that has a simultaneous PUSCH and PUCCH transmissions. The octet 342-3 comprises 1 P bit, 1 V bit, and 6 bits for Indicating PH values. In some embodiments, the 6 PH bits of the octet 342-3 containing a type 1 PHR field if a cell comprising a DL transmission resource and multiple UL transmission resource is configured as a PCell. The type 1 PHR is for a UL transmission resource in a PCell that has a PUSCH transmission. In some embodiments, the octets 342-2 and 342-4 includes 2 R bits, and 6 bits for indicating a maximum transmit power level of the first UL transmission resource in the PCell.

A plurality of octet blocks is then configured in the PHR for at least one UL transmission resource in each of a plurality of SCells, wherein each of the plurality of octet blocks is for one SCell. Instead of using carrier index or cell index, the organization of the PHR report in an octet block for all the UL transmission carriers within the same SCell and the organization of the plurality of octet blocks are in a predefined order (UL transmission resource 1 in SCell 1, UL transmission resource 2 in SCell 1, UL transmission resource 1 in SCell 2, UL transmission resource 2 in SCell 2, etc.). Specifically, the octets 342-5 and 342-7 each comprises 1 P bit, 1 V bit and 6 PH bits for Indicating PH values. In some embodiments, the 6 PH bits of the octets 342-5 and 342-7 contain a type 1 or a type 3 PHR field when a cell comprising a DL transmission resource and a plurality of UL transmission resources is configured as a first SCell. The octets 342-6 comprises 1 E bit, 1 R bit, and 6 bits for indicating a maximum transmission power value of a first UL transmission resource of the first SCell. The E bit is used rather than an R bit in the octet 342-6 to indicate whether one more type 1 or type 3 PHR is followed for the same serving cell. The octet 342-8 comprises 2 R bits and 6 bits for indicating a maximum transmission power value of the second UL transmission resource of the first SCell. In some embodiments, the octets 342-5 and 342-6 are for a first UL transmission resource combined with the DL transmission resource of the first SCell. In some embodiments, the octets 342-5 and 342-6 are for a first UL transmission resource of the first SCell where a PUCCH is configured. Although only 2 octet pairs (e.g., 4 octets for 2 UL transmission resources in 1 SCell) are shown in an octet block 343-1, any number of UL transmission resources in the first SCell can be included and are within the scope of this disclosure. In some embodiments, the number of octet pairs is determined by the number of UL transmission resources in a SCell.

The octet 342-9 comprises 1 P bit, 1 V bit, and 6 PH bits for Indicating PH values. In some embodiments, the 6 PH bits of the octet 342-9 containing a type 1 or a type 3 PHR field if a cell comprising a DL transmission resource and at least one UL transmission resource is configured as a SCell. In some embodiments, the $n^{th}$ SCell contains only 1 UL transmission resource thus one octet pair for the $n^{th}$ SCell. In some embodiments, the octets 342-10 includes 2 R bits, and 6 bits for indicating a maximum transmission power level of the UL transmission resource of the $n^{th}$ SCell. In some embodiments, n equals 8 describing a maximum number of SCells that can be supported. Although only 2 octet blocks 343-1 and 343-2 are shown in the figure, it should be noted that the number of octet blocks representing the number of SCells can be used which are within the scope of this invention.

FIG. 3F illustrates a power headroom (PHR) format 350 transmitted from the UE 104 to the BS 102, in accordance with some embodiments of the present disclosure. In some embodiments, a PHR is MAC layer control information and comprises 12 octets, including octets 352-1, 352-2, 352-3, 352-4, 352-5, 352-6, 352-7, 352-8, 352-9, 352-10, 352-11, and 352-12. The octet 352-1 comprises 1 P bit, 1 V bit and 6 PH bits for Indicating PH values. The P bit indicates whether the UE 104 applies a power backoff due to power management. In some embodiments, the P bit value can be "1" or "0" depending on the maximum UE output power. The V bit indicates if the PH value is based on a real transmission or a reference format. In some embodiments, the V bit value can be "1" or "0" depending on whether or not the PH value is based on a real transmission or a reference format. In some embodiments, the 6 PH bits of the octets 352-1 contain a type 2 PHR field if a cell comprising a DL transmission resource and a plurality of UL transmission resource is configured as a PCell and a type 2 PH is reported. Similarly, the octet 352-3 comprises 1 P bit, 1 V bit and 6 PH bits for Indicating PH values. In some embodiments, the 6 PH bits of the octet 352-3 containing a type 2 PHR field if a cell comprising a DL transmission resource and a plurality of UL transmission resource is configured as a first SCell and a type 2 PH is reported. The type 2 PHR is for a UL transmission resource in a PCell or a SCell that has a simultaneous PUSCH and PUCCH transmissions. In some embodiments, the octets 352-2 and 352-4 includes 2 R bits, and 6 bits for indicating maximum transmission power levels of first UL transmission resource of the PCell and SCell, respectively. In some embodiments, the octets 352-1 and 352-2 are for a first UL transmission resource with a PUCCH in the PCell if a type 2 PHR is reported.

The octet 352-5 comprises 1 P bit, 1 V bit, and 6 bits for Indicating PH values. In some embodiments, the 6 PH bits of the octet 352-5 contain a type 1 PHR field if the PCell comprising a DL transmission resource and multiple UL transmission resource is configured as the PCell. The type 1 PHR is for a UL transmission resource in a cell that has a PUSCH transmission. The octet 352-6 includes 2 R bits, and 6 bits for indicating a maximum transmission power level of the first carrier of the PCell. In some embodiments, the octets 352-5 and 352-6 are for first UL transmission resource in the first PCell.

A plurality of octet blocks is then configured in the PHR for at least one UL transmission resource in each of a plurality of SCells, wherein each of the plurality of octet blocks is for one SCell. Instead of using carrier index or cell index, the organization of the PHR report in an octet block for all the UL transmission carriers within the same SCell and the organization of the plurality of octet blocks are in a predefined order (UL transmission resource 1 in SCell 1, UL transmission resource 2 in SCell 1, UL transmission resource 1 in SCell 2, UL transmission resource 2 in SCell 2, etc.). Specifically, the octets 352-7 and 352-9 each comprises 1 P bit, 1 V bit and 6 bits for Indicating PH values. In some embodiments, the 6 PH bits of the octets 352-7 and 352-9 contain a type 1 or a type 3 PHR field if a cell comprising a DL carrier and a plurality of UL transmission resources is configured as a second SCell. The octets 352-8 comprises 1 E bit, 1 R bit, and 6 bits for indicating a maximum transmission power value of the first UL transmission resource in the second SCell. The E bit is used rather than an R bit in the octet 352-8 to indicate whether one more type 1 or type 3 PHR is followed for the same serving cell. The octet 352-10 comprises 2 R bits and 6 bits for indicating a maximum transmission power value of the second UL transmission resource of the second SCell. In some embodiments, the octets 352-7 and 352-8 are for the first UL transmission resource combined with the DL transmission resource of the second SCell. In some embodiments, the octets 352-7 and 352-8 are for the first UL transmission resource in the second SCell where a PUCCH is configured. In some embodiments, the octets 352-9 and 352-10 are for the second UL transmission resource in the second SCell. Although only 2 octet pairs (e.g., 4 octets for 2 UL transmission resources in 1 SCell) are shown in the octet block 353-1, any number of octet pairs corresponding to any number of UL transmission resources in a SCell can be included and are within the scope of this disclosure. In some embodiments, the number of octet pairs is determined by the number of UL transmission resources in a SCell.

The octet 352-11 comprises 1 P bit, 1 V bit, and 6 PH bits for Indicating PH values. In some embodiments, the 6 PH bits of the octet 352-11 contain a type 1 or a type 3 PHR field if a cell comprising a DL transmission resource and multiple UL transmission resources is configured as a $n^{th}$ SCell. In some embodiments, the $n^{th}$ SCell contains only 1 UL transmission resource. In some embodiments, the octets 352-12 includes 2 R bits, and 6 bits for indicating a maximum transmission power level of the UL transmission resource of the $n^{th}$ SCell. In some embodiments, n equals 8 describing a maximum number of SCells that can be supported. Although only 2 octet blocks 353-1 and 353-2 are shown in the figure, it should be noted that the any number of octet blocks thus SCells can be used which are within the scope of this invention.

Figure 3G:
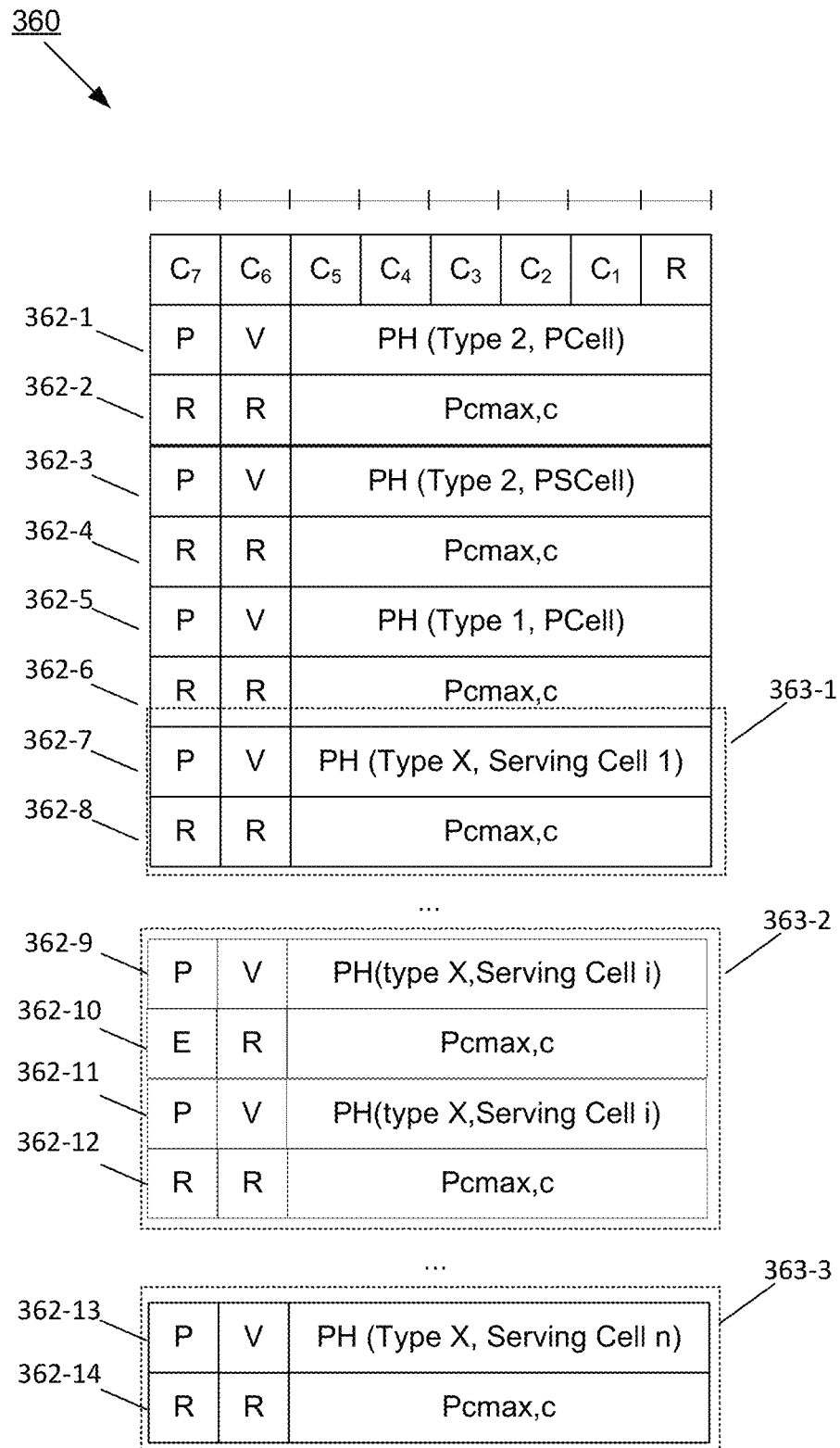
FIG. 3G illustrates a power headroom report (PHR) format transmitted from a UE to a BS, in accordance with some embodiments of the present disclosure.

FIG. 3G illustrates a power headroom (PHR) format 360 transmitted from the UE 104 to the BS 102, in accordance with some embodiments of the present disclosure. In some embodiments, a PHR is MAC layer control information and comprises 14 octets, including octets 362-1, 362-2, 362-3, 362-4, 362-5, 362-6, 362-7, 362-8, 362-9, 362-10, 362-11, 362-12, 362-13 and 362-14. The octet 362-1 comprises 1 P bit, 1 V bit and 6 bits for Indicating PH values. The P bit indicates whether the UE 104 applies a power backoff due to power management. In some embodiments, the P bit value can be "1" or "0" depending on the maximum UE output power. The V bit indicates if the PH value is based on a real transmission or a reference format. In some embodiments, the V bit value can be "1" or "0" depending on whether or not the PH value is based on a real transmission or a reference format. In some embodiments, the 6 PH bits of the octets 362-1 contain a type 2 PHR field if a cell comprising a DL transmission resource and a plurality of UL transmission resources is configured as a PCell and a type 2 PH is reported. Similarly, the octet 362-3 comprises 1 P bit, 1 V bit and 6 PH bits for Indicating PH values. In some embodiments, the 6 PH bits of the octet 362-3 containing a type 2 PHR field if a cell comprising a DL carrier and a plurality of UL carriers is configured as a PCell/SCell with a dual connectivity and a type 2 PH is reported. The type 2 PHR is for a UL transmission resource in a PCell that has a simultaneous PUSCH and PUCCH transmissions or a SCell that has a PUSCH transmission. In some embodiments, the octets 362-2 and 362-4 includes 2 R bits, and 6 bits for indicating maximum transmission power levels of first UL transmission resource of the PCell and the PCell/SCell with a dual connectivity, respectively.

The octet 362-5 comprises 1 P bit, 1 V bit, and 6 bits for Indicating PH values. In some embodiments, the 6 PH bits of the octet 362-5 containing a type 1 PHR field if a cell comprising a DL carrier and multiple UL carriers is configured as PCell. The type 1 PHR is for a UL transmission resource in a PCell that has a PUSCH transmission. The octet 362-6 includes 2 R bits, and 6 bits for indicating a maximum transmission power level of the first UL transmission resource of the PCell. In some embodiments, the octets 362-5 and 362-6 are for the first UL transmission resource in the PCell.

The octet 362-7 comprises 1 P bit, 1 V bit, and 6 bits for Indicating PH values. In some embodiments, the 6 PH bits of the octet 362-7 contain a type 1 or a type 3 PHR field if a first serving cell comprising a DL carrier and multiple UL carriers is configured. In some embodiments, the first serving cell only comprises one UL transmission resource. The octet 362-8 includes 2 R bits, and 6 bits for indicating a maximum transmission power level of a first UL transmission resource of the first serving cell. In some embodiments, the octets 362-7 and 362-8 in a first octet block 363-1 are for the first UL transmission resource in the first serving cell.

The octets 362-9 and 362-11 each comprises 1 P bit, 1 V bit and 6 bits for Indicating PH values. In some embodiments, the 6 PH bits of the octets 362-9 and 362-11 contain a type 1 or a type 3 PHR field if a cell comprising a DL carrier and a plurality of UL carriers is configured. The octets 362-10 comprises 1 E bit, 1 R bit, and 6 bits for indicating a maximum transmission power value of a first UL transmission resource of the second serving cell. The E bit is used rather than an R bit in the octet 362-10 to indicate whether one more type 1 or type 3 PHR is followed for the same serving cell. The octet 362-12 comprises 2 R bits and 6 bits for indicating a maximum transmission power value of a second UL transmission resource of the second serving cell. some embodiments, the octets 362-9 and 362-10 are for the first UL transmission resource combined with the DL transmission resource of the second serving cell. In some embodiments, the octets 362-9 and 362-10 are for a first UL transmission resource in the second serving cell, where a PUCCH is configured. In some embodiments, the octets 362-11 and 362-12 are for the second UL transmission resource of the second serving cell. Although only 2 octet pairs (e.g., 4 octets for 2 UL transmission resource in 1 serving cell) are shown in the second octet block 363-2, any number of octet pairs for UL transmission resources in a serving cell can be included and are within the scope of this disclosure. In some embodiments, the number of octet pairs in an octet block is determined by the number of UL transmission resources in a serving cell.

The octet 362-13 comprises 1 P bit, 1 V bit, and 6 PH bits for Indicating PH values. In some embodiments, the 6 PH bits of the octet 362-13 contain a type 1 or a type 3 PHR field if a $n^{th}$ serving cell comprising a DL carrier and multiple UL carriers is configured. In some embodiments, the $n^{th}$ SCell contains only 1 UL transmission resource. In some embodiments, the octets 362-14 includes 2 R bits, and 6 bits for indicating a maximum transmission power level of the UL carrier of the $n^{th}$ serving cell. In some embodiments, the octet 362-13 and 362-14 in a third octet block 363-3 are for a UL transmission resource in the $n_{th}$ serving cell. In some embodiments, n equals 8 describing a maximum number of serving cells that can be supported.

Referring to FIG. 2, the method 200 continues with operation 207 in which an UL transmission resource is further selected by the BS 102 according to the PHR received from the UE 104, in accordance with various embodiments. The at least one PH value in a PHR is reported from the UE 104 to the BS 102. The BS 102 can determine the PH value for individual serving cells with only one PHR, e.g., PHR format with carrier/cell index as described in FIGS. 3A-B and PHR format with predefined orders as described in FIGS. 3C-G. In some embodiments, the BS 102 determines the PH value based on the real PUSCH transmissions or a PUSCH reference format. In some embodiments, the BS 102 can obtain the PHR according to the MAC header. Furthermore, to assist the scheduler, the BS 102 can configure the UE 104 to report buffer status reports (BSRs), wherein the BSR can indicate the amount of data the user equipment has available for transmission.

The method 200 continues with operation 209 in which a scheduling is performed by the BS 102 and thereafter indicated to the UE 102, in accordance with various embodiments. The scheduler allocates uplink resources according to the at least one PH value of the at least one UL transmission resource in a serving cell, in order to avoid exceed the UE maximum transmission power. The method 200 continues with operation 201 in which a RRC (radio resource control) message is transmitted by the BS 102 to the UE104, in accordance with various embodiments. Typically, a PHR from a UE 104 to a BS 102 can be triggered to constantly monitor the PH values of a UL transmission resource. For example, when the path loss on the DL carrier associated with an UL carrier becomes equal to or greater than a predetermined threshold value, or when a predetermined time period has elapsed (i.e., a periodic PHR timer), the PHR is triggered. Specifically, a PHR is triggered when the path loss of the downlink carrier associated with an uplink carrier becomes equal to or greater than a predetermined threshold value. The periodic PHR timer is a timer for triggering PHR periodically. Therefore, according to certain embodiments, the PHR in operation 205 and the UL carrier selection in operation 207 are repeated periodically.

In addition to the PHR triggering event discussed above, either by monitoring the path loss or a periodic PHR timer, the PHR can be also triggered by any changes to the at least one UL transmission resource, in accordance with various embodiments. The PHR can be triggered when the BS 102 configures, reconfigures, or adds at least one of the following on the at least one UL transmission resource, for example PUSCH dedicated configuration, SR resources, CQI resources, SRS dedicated resources, SPS resources, and UL power dedicated configuration, according to certain embodiments. In some embodiments, the PHR can be also triggered when the BS 102 adds, activates, or reconfigures the at least one UL transmission resource. In some embodiments, the PHR can be further triggered when the BS 102 indicates the UE 104 to switch to the at least one UL transmission resource. In some embodiments, transmitting of the PHR triggering message can be carried in a RRC message from the BS 102 to the UE 104.

The UE 104 may perform a Random Access Channel (RACH) Procedure in an idle state or in a connected state. In this case, the UE 104 may transmit a specific sequence through a Physical Random Access Channel (PRACH) as a preamble, and receive a response message of the preamble through the PDCCH and the PDSCH corresponding thereto. In the case of contention-based RACH, a contention resolution procedure may be further performed. In some embodiments, when the UE 104 is in an idle state, the UE 104 can get the information about multiple transmission resources and PRACH through the system information from the BS 102. The UE 104 then selects an UL transmission resource based on measured RSRP (reference symbol received power) value, and then triggers a random access process. Similarly, when the UE 104 is in a connected state, the random access process is also necessary. Especially for the contention random access process, this is because unlike under the idle state, the UE 104 in a connected state has previously obtained information about the at least one UL transmission resource.

In some embodiments, under the connected state, the BS 102 can notify the UE 104 information of at least one UL carrier that contains PUCCH resources, e.g., feedback ACK/NACK PUCCH resources, SR resources, CQI resources, etc., using a RRC message or system information as discussed above in FIG. 2, according to the location of the UE 104, uplink load, signal quality and other factors. In this case, the success rate of random access process can be improved. During random access and when a UE 104 is in the connected state, the UE 104 can only select the at least one UL transmission resource with PUCCH resources in the contention random access process, in accordance with various embodiments. Furthermore, if the UE 104 is configured with an UL transmission resource with PUCCH resources, then the UE 104 can initiate a random access process for this UL transmission resource. In some embodiments, if the UE 104 is equipped with a plurality of UL transmission resources with PUCCH resources, the UE 104 can select at least a UL transmission resource within the plurality of UL transmission resources, then according to the at least one measured RSRP value to further select an UL transmission resource to initialize a random access process.

When the contention random access procedure using the UL transmission resource with PUCCH resources fails, for example the number of transmit preamble exceeds the maximum number and DL transmission resource remains effective, the UE 104 can further select an UL transmission resource from a plurality of UL transmission resources that do not contain PUCCH resources and then initiates another random access process using the selected UL transmission resource.

In some embodiments the RRC message also contains configuration parameters indicating whether a simultaneous PUCCH and PUSCH on different transmission resources or a simultaneous PUCCH and PUSCH on the same transmission resource. In certain embodiments, the RRC message can be aRRCConnectionSetup message or a RRCConnectionReconfiguration message.

While various embodiments of the invention have been described above, it should be understood that they have been presented by way of example only, and not by way of limitation. Likewise, the various diagrams may depict an example architectural or configuration, which are provided to enable persons of ordinary skill in the art to understand exemplary features and functions of the invention. Such persons would understand, however, that the invention is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two, which can be designed using source coding or some other technique), various forms of program or design code incorporating instructions (which can be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware, firmware or software, or a combination of these technique, depends upon the particular application and design constraints imposed on the overall system. Skilled artisans can implement the described functionality in various ways for each particular application, but such implementation decisions should not be interpreted as causing a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the invention.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method performed by a wireless communication device, comprising:
   receiving a message containing first information of at least one first uplink transmission resource from a wireless communication node;
   based on the first information, determining at least one power headroom (PH) value for the at least one first uplink transmission resource; and
   reporting second information of the at least one first uplink transmission resource to the wireless communication node, wherein the second information indicates a PH report length of a cell.

2. The method of claim 1, wherein the first information of the at least one first uplink transmission resource indicates at least one of the following: physical uplink control channel (PUCCH) for ACK/NACK, dedicated PUCCH resources for ACK/NACK, PUCCH location, scheduling request (SR) resources, channel quality indicator (CQI) resources, sounding reference symbols (SRS) dedicated resources, semi-persistent scheduling (SPS) resources, physical uplink shared channel (PUSCH) dedicated configuration, uplink power dedicated configuration, index, activated carriers, added carriers and switched carriers.

3. The method of claim 1, wherein the first information further carries one of the following configurations: simultaneous PUCCH and PUSCH transmission on same uplink transmission resources, and simultaneous PUCCH and PUSCH transmission on different uplink transmission resources.

4. The method of claim 1, wherein the reporting second information to the wireless communication node is triggered by a first event, wherein the first event comprises the wireless communication node modifying one of the following of the at least one first uplink transmission resource: uplink power dedicated configuration, physical uplink shared channel (PUSCH) dedicated resources, scheduling request resources, channel quality indicator resources, sound reference symbols dedicated resources, and semi-persistent scheduling resources, wherein the modifying comprises at least one of the following operation: configuring, reconfiguring and adding.

5. The method of claim 4, wherein the first event further comprises the wireless communication node adding at least one second uplink transmission resource to the at least one first uplink transmission resource, activating the at least one second uplink transmission resource, and switching from the at least one first uplink transmission resource to the at least one second uplink transmission resource.

6. The method of claim 2, wherein the index of the at least one first uplink transmission resource can be further transmitted through one of the following: a control element in a media access control layer (MAC-CE), downlink control information (DCI), and system information and RRC message.

7. The method of claim 1, wherein the second information further comprises the at least one PH value and at least one maximum transmission power value for the at least one first uplink transmission resource.

8. The method of claim 7, wherein the at least one PH value and the at least one maximum transmission power value of at least one second uplink transmission resource are configured first in the second information, wherein the at least one second uplink transmission resource is one of the following: at least one first uplink transmission resource combined with a downlink transmission resource, and at least one first uplink transmission resource configured with PUCCH resources.

9. The method of claim 1, wherein the second information further comprises at least one E bit, wherein the at least one E bit indicates the PH report length.

10. The method of claim 1, wherein the at least one PH value each is indexed by a carrier index, wherein the carrier index can be one of the following: an index of the at least one first uplink transmission resource of the wireless communication device, and a number of the at least one first uplink transmission resource of the wireless communication device, wherein the number comprises a carrier index and a cell index.

11. The method of claim 1, further comprising
performing an uplink communication with the wireless communication node on at least one uplink transmission resource, and
selecting one third uplink transmission resource from the at least one first uplink transmission resources, wherein the one third uplink transmission resource is configured with PUCCH resources to re-establish an uplink synchronization or PUCCH resources.

12. A method performed by a wireless communication node, comprising:
transmitting first information of at least one first uplink transmission resource to a wireless communication device;
receiving second information from the wireless communication device, wherein the second information comprises the at least one power headroom (PH) value corresponding to the at least one first uplink transmission resource and indicates a PH report length of a cell; and
selecting at least one second uplink carrier for the wireless communication device to perform an uplink communication.

13. The method of claim 12, wherein the first information of the at least one first uplink transmission resource indicates at least one of the following: physical uplink control channel (PUCCH) for ACK/NACK, dedicated PUCCH resources for ACK/NACK, PUCCH location, scheduling request (SR) resources, channel quality indicator (CQI) resources, sounding reference symbols (SRS) dedicated resources, semi-persistent scheduling (SPS) resources, physical uplink shared channel (PUSCH) dedicated configuration, uplink power dedicated configuration, index, activated carriers, added carriers and switched carriers.

14. The method of claim 12, wherein the first information further carries one of the following configurations: simultaneous PUCCH and PUSCH transmission on same uplink transmission resources, and simultaneous PUCCH and PUSCH transmission on different uplink transmission resources.

15. The method of claim 12, wherein the receiving second information from the wireless communication device is triggered by a first event, wherein the first event comprises the wireless communication node modifying one of the following of the at least one first uplink transmission resource: uplink power dedicated configuration, physical uplink shared channel (PUSCH) dedicated resources, scheduling request resources, channel quality indicator resources, sound reference symbols dedicated resources, and semi-persistent scheduling resources, wherein the modifying comprises at least one of the following operation: configuring, reconfiguring and adding.

16. The method of claim 15, wherein the first event further comprises the wireless communication node adding at least one second uplink transmission resource to the at least one first uplink transmission resource, activating the at least one second uplink transmission resource, and switching from the at least one first uplink transmission resource to the at least one second uplink transmission resource.

17. The method of claim 13, wherein the index of the at least one first uplink transmission resource can be further transmitted through one of the following: a control element in a media access control layer (MAC-CE), downlink control information (DCI), and system information and RRC message.

18. The method of claim 12, wherein the second information further comprises the at least one PH value and at least one maximum transmission power value for the at least one first uplink transmission resource.

19. The method of claim 12, wherein the at least one PH value and the at least one maximum transmission power value of at least one second uplink transmission resource are configured first in the second information, wherein the at least one second uplink transmission resource is one of the following: at least one first uplink transmission resource combined with a downlink transmission resource, and at least one first uplink transmission resource configured with PUCCH resources.

20. The method of claim 12, wherein the second information further comprises at least one E bit, wherein the at least one E bit indicates the PH report length.

* * * * *